Sept. 23, 1947.   H. M. LESTER   2,427,969
HIGH INTENSITY ILLUMINATION FOR HIGH-SPEED MOTION-PICTURE PHOTOGRAPHY
Filed March 26, 1945   4 Sheets-Sheet 1

INVENTOR
Henry M. Lester
BY
Emery, Booth, Townsend, Miller and Lardner
ATTORNEYS

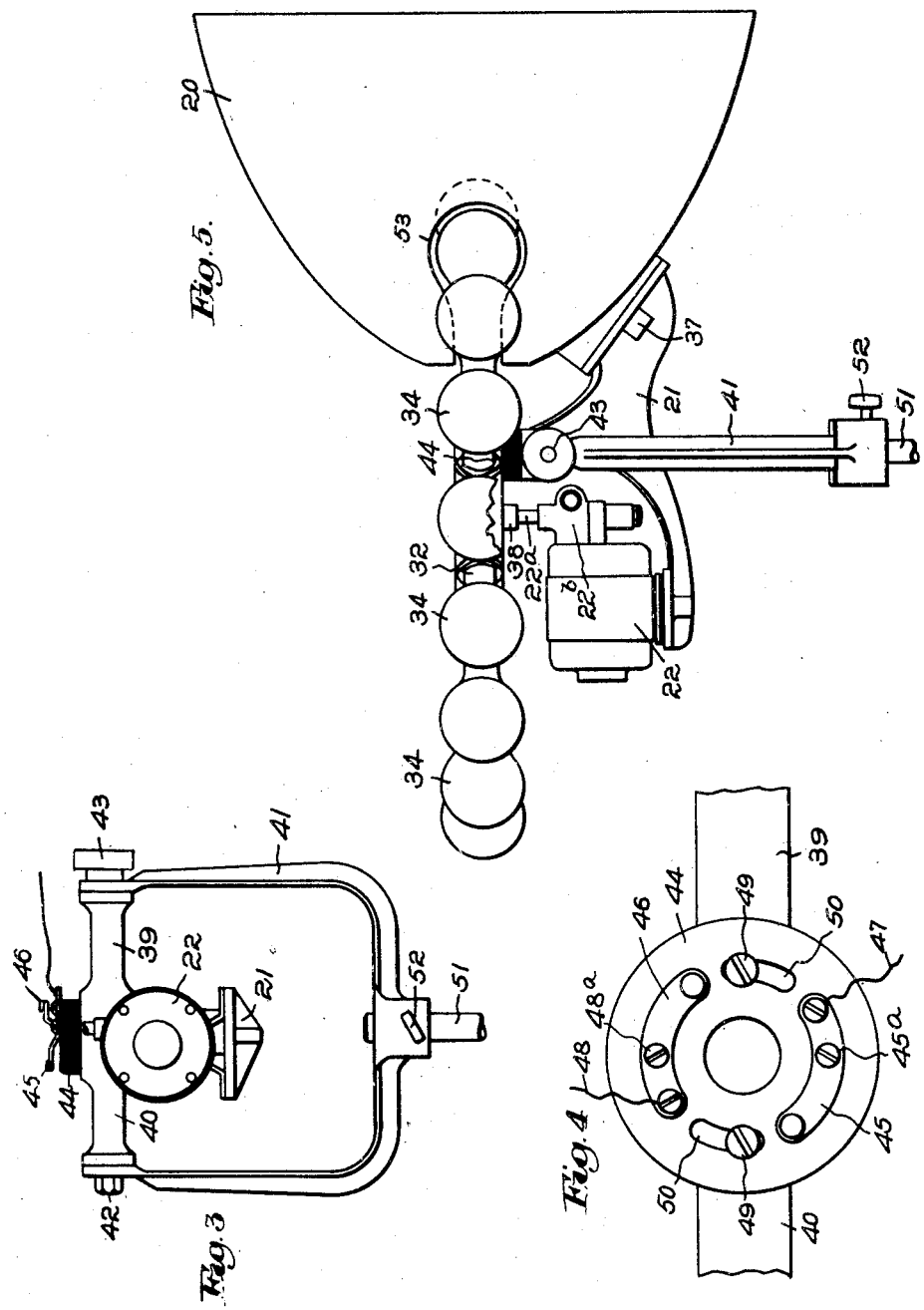

Sept. 23, 1947.    H. M. LESTER    2,427,969
HIGH INTENSITY ILLUMINATION FOR HIGH-SPEED MOTION-PICTURE PHOTOGRAPHY
Filed March 26, 1945    4 Sheets-Sheet 3

Time-Light Characteristic Curve of a Single Flash Lamp.

INVENTOR
Henry M. Lester
BY
ATTORNEYS

Sept. 23, 1947. H. M. LESTER 2,427,969
HIGH INTENSITY ILLUMINATION FOR HIGH-SPEED MOTION-PICTURE PHOTOGRAPHY
Filed March 26, 1945 4 Sheets-Sheet 4
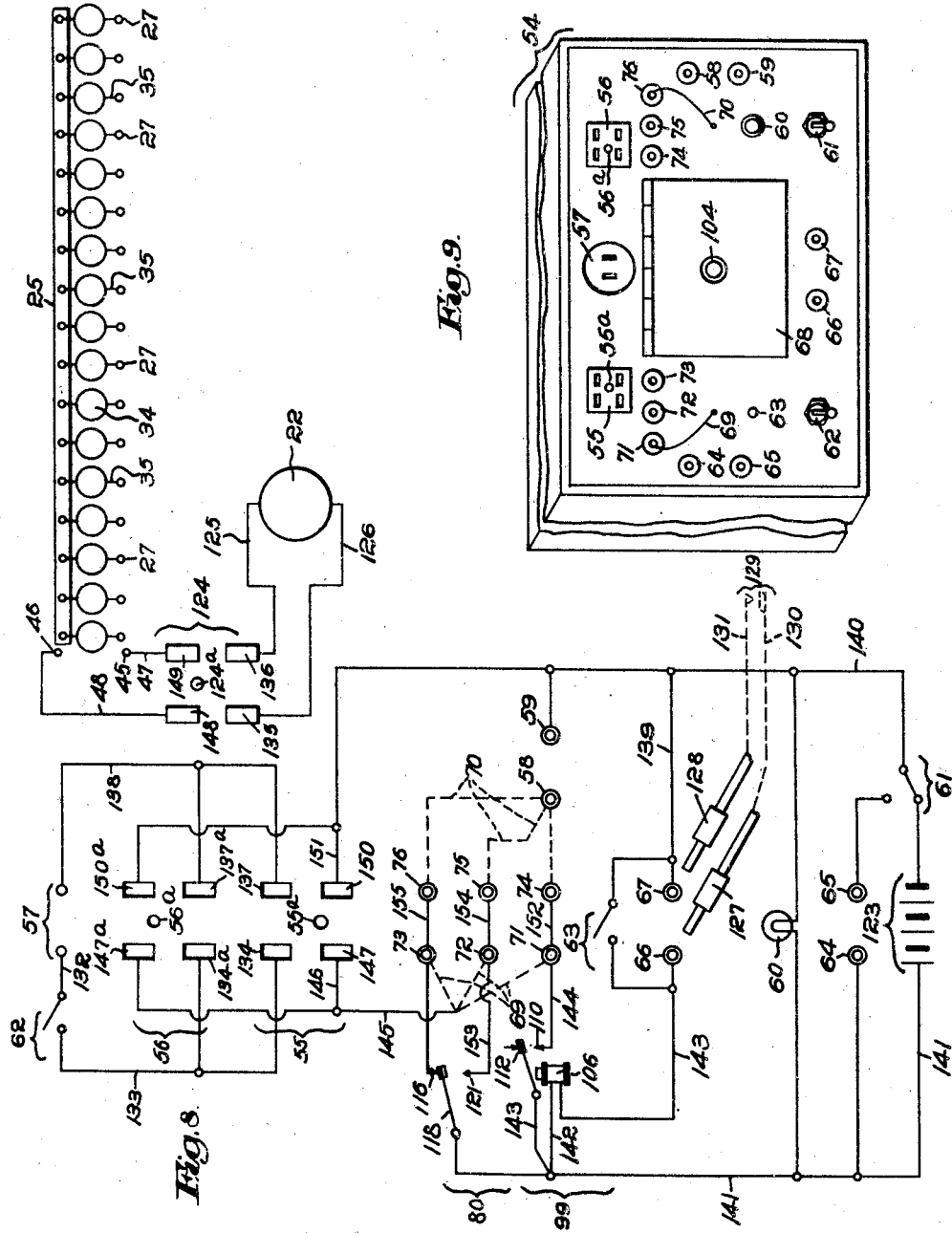
INVENTOR
*Henry M. Lester*
BY
ATTORNEYS.

Patented Sept. 23, 1947

2,427,969

UNITED STATES PATENT OFFICE 2,427,969

HIGH INTENSITY ILLUMINATION FOR HIGH-SPEED MOTION-PICTURE PHOTOGRAPHY

Henry M. Lester, New York, N. Y., assignor to Graflex, Inc., Rochester, N. Y., a corporation of Delaware Application March 26, 1945, Serial No. 584,791

17 Claims. (Cl. 67—29)

This invention relates to a new source of illumination and is particularly adapted for use with high speed photographic cameras. High speed motion picture cameras capable of taking pictures on continuously moving film at the rate of upward of 3000 frames per second produce exposures on the order of 1/15000 of a second or less. Exposures of such brevity call for illumination of great intensity.

Incandescent lamps capable of providing such illumination have many disadvantages, among which are great power requirements, heavy conductors, emission of considerable heat, great bulk of appliances and reflectors, etc., though the actual time during which such high intensity illumination is required is seldom more than one second.

In this application I disclose a method and suitable equipment for securing an adequate light source for this purpose. Since the total time requirements of illumination for making a scene with a high speed movie camera is seldom greater than one second, in this disclosure of my invention I show an apparatus to provide a very high intensity illumination of a substantially constant value for a period of one second. However, this invention is not confined to this particular length of exposure, as it can be modified to provide an exposure of any suitable length, as will be apparent from the specification.

Among the objects of this invention are: to provide a high intensity source of illumination that is readily portable; to provide a source of illumination using standard flashlamp bulbs of the type comprising a sealed, transparent envelope in which is enclosed a readily combustible material such as metal wire and/or foil, together with suitable ignition means therefor, and a substance, usually a gas filling, which, upon ignition of the flashlamp, enters into a reaction with the combustible material with the resulting emission of actinic light, and which flashlamp bulb I will hereinafter, for brevity, refer to simply as of "said type" or "of the described type," or "of the type containing combustible material"; to provide controlled means for successively firing a group of flash bulbs of said type, so that the resultant illumination provided therefrom will be substantially uniform; to provide a light source that can readily be controlled from the photographic camera, so as to synchronize the commencement of illumination with a predetermined run of the camera; to provide means for controlling the main light source with respect to an auxiliary light source, such auxiliary light source being initiated by the camera and the main light source being automatically delayed by a readily adjustable time delay mechanism; and to provide means for operating two or more light sources, as described herein, in synchronism with each other and having their starting time controlled either by the camera or by an auxiliary starting means.

My invention comprises a method of and mechanism for providing high intensity illumination for high-speed motion-picture photography wherein and by which there are carried out the following steps: (1) positioning a multiplicity of photoflash bulbs of the type containing combustible material, each of acceptable peak and length when flashed for photographic purposes so that the light of each of them may, when flashed, be directed during the effective portion of its flash at the same object to be photographed, (2) synchronizing the feeding and continuous exposure of the film of the said high-speed motion-picture camera with the flashing of the said multiplicity of such bulbs during such single exposure of such camera, and (3) flashing all of said multiplicity of bulbs of said type during a single exposure cycle of the high speed camera during which a very great number of exposures occur, as already stated, at such closely spaced intervals and with such time lapse between the creation of consecutive flashes that the intensity peak of the light from each flashed bulb of said type follows so closely the intensity peak of the light of the bulb of said type flashed immediately preceding, that there is produced a resultant light continuous throughout the flashing of the said multiplicity of bulbs of said type with sufficient overlapping of the flashes to provide a continuous light of high intensity maintained at approximately a mean resultant level acceptable for high-speed motion-picture photography.

The mechanism for carrying out such method includes means for supporting the multiplicity of brief-intensity-peak photoflash bulbs of said type in close proximity. The supporting means for the multiplicity of bulbs of said type is a movable one and is preferably a rotary one whereon such bulbs of said type are arranged in radial spaced relation, means being provided to impart movement of rotation to the rotary support at such a speed and in such timed relation to the successive flashing of such type of photographic bulbs that each such bulb, when it is flashed, is at substantially the same point, with relation to the object to be photographed, at which each of the other such bulbs is positioned when said other such bulbs are successively flashed. The mechanism for carrying out the method includes a reflector in fixed relation to the object to be photographed and in such proximity to the movable support for such type of bulbs that each of the said bulbs may in succession, in the movement of the support, be presented by the support in front of such reflector. Means is provided to impart relative movement to the reflector and the support. In the disclosed embodiment of the mechanism the reflector is held stationary and the support is moved, preferably by rotating the same.

A better understanding of this invention will be had from the following specification together with the drawings, wherein—

Fig. 3 is a fragmentary front elevation of the illuminating unit having the reflector and bulb carrying wheel removed to show most clearly the mounting of one of the contacting brushes;

Fig. 4 is an enlarged detail of the mounting means for the contacting brushes and clearly shows the means for adjusting the position of said brushes in a circumferential direction;

Fig. 5 is a side elevation of the illuminating unit, clearly showing the mounting of the reflector, the motor and the lamp carrying wheel on the supporting gimbal, and showing the opening in the reflector through which the lamps containing combustible material successively pass when the wheel is rotating;

Fig. 8 is a wiring diagram clearly showing the several methods of operation;

Fig. 9 is an isometric view of the control box; and

Figure 1:
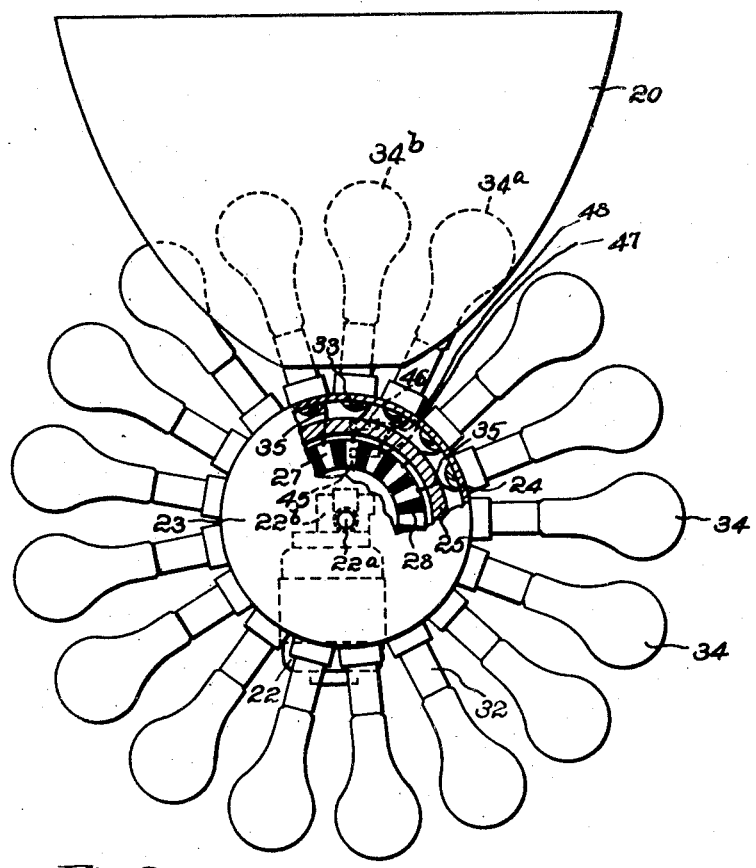
Fig. 1 is a top plan view of my lighting unit showing the position of the reflector with respect to the lamp mounting wheel, certain parts of the wheel being broken away to show clearly the commutator and the connections between the lamps and the commutator segments.
Figure 2:
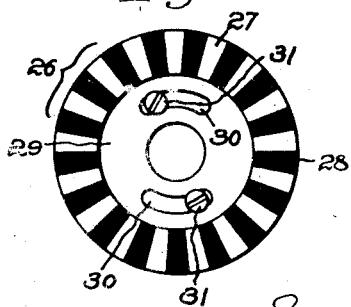
Fig. 2 is an enlarged detail constituting a bottom plan view of the commutator to show more clearly the adjusting means of the commutator.

Referring first to Figs. 1 and 2, a reflector, indicated at 20, is suitably supported on a frame 21, shown in Figs. 3 and 5, to be subsequently described in detail. The said frame is also mounted with respect to a motor shown in dotted lines in Fig. 1 at 22 and in solid lines in Figs. 3 and 5, having a vertical shaft 22a and a gear box 22b. To said shaft 22a is attached a wheel-like member, disk or rotary support 23 having a downwardly extending rim 24 and a second downwardly extending cylindrical flange, shown in section and indicated at 25. Suitably attached to said wheel-like member, disk or rotary support 23 is a commutator 26, best shown in Fig. 2, having a series of segments 27, 27 insulated from each other by any suitable insulation, indicated at 28. The said commutator 26 is made up of said segments 27 and said insulation 28 which is mounted on a plate 29 having elongated circumferentially extending openings 30, through which screws 31, 31 pass and which are threaded into the wheel-like member, disk or rotary support. The commutator 26 can be moved circumferentially with respect to the wheel-like member, disk or rotary support 23, thus providing one means of timing the contact with flashlamps 34, 34 containing combustible material.

Mounted on the rim 24 of the said wheel-like member, disk or rotary support 23 is a series or multiplicity of sockets 32, 32, being held in place by means of screws 33, 33. Mounted in the sockets 32, either by threading or any other suitable manner, are photoflash lamps 34 which contain combustible material. One terminal of each such lamp 34 is grounded, thus being connected directly to the rim 24. The other terminal of each such lamp 34 is connected to one of the screws 33, 33 which are connected to the segments 27 by wires 35. It will be noted that each such lamp 34 has one side connected to the wheel-like member, disk or rotary support 23, as previously stated, and that the other side of each such lamp is connected to one segment of the commutator which has the same number of commutator segments as the number of such lamps used, which number may be substantially varied within the scope of the invention. For example, it may be found desirable to use a flashlamp of the described type having a longer duration of flash, in which case they would be flashed substantially slower and be fewer in number.

Referring to Figs. 3, 4 and 5, the latter, being a side elevation of the illuminating device, clearly shows the bracket 21 and makes evident the manner in which the reflector 20 is attached thereto by means of bolts 37. The support for the motor 22 is also clearly shown, as well as the motor shaft 22a. The said wheel-like member, disk or rotary support 23 is provided with a hub 38 which is directly attached to the shaft 22a by any suitable means, such as a set screw.

The bracket 21 is provided, as shown in Fig. 3, with right and left hand extending arms 39, 40, respectively, and is supported in a gimbal-like member 41, being attached thereto by a bolt 42 and a locknut 43, so that said bracket is free to rotate in the gimbal 41 when the locknut 43 is loosened, and it can then be tightened and held in any suitable position. Attached to the bracket 21 is an insulating block 44, best shown in Figs. 3 and 4, having attached thereto commutator brushes 45 and 46.

The brush 45 makes contact with commutator segments 27, 27, and the brush 46 makes contact with the cylindrical ring 25. Said brushes 45 and 46 are provided with suitable connecting leads 47 and 48 respectively.

The insulating block 44, as shown in Fig. 4, is attached to the junction of arms 39 and 40 by means of screws 49, 49. The insulating block 44 is provided with elongated circumferentially extending openings 50, through which screws 49, 49 pass and are threaded into the arms 39 and 40. It will be noted that the position of the brushes 45 and 46 can be altered slightly by turning the insulating block 44, thus providing a second means of adjusting the timing to the flash lamps of the described type.

The gimbal 41 is supported on a post 51 and is free to rotate thereon when the clamp screw 52 is loosened. Said gimbal 41 can be locked in any suitable position for directing the position of the reflector 20 which can be tilted by loosening clamp nut 43, as previously referred to.

When power is supplied to the motor 22, the shaft 22a is caused to rotate through gear box 22b. Said shaft 22a is driven at a reduced speed, in this instance, one revolution per second. The wheel-like member, disk or rotary support 23 is also caused to rotate as it is locked to shaft 22a.

The flashlamps 34, 34 of the described type will rotate with the wheel-like member, disk or rotary support 23 and, when rotating, will pass through an opening, passage or transverse formation 53 in the reflector 20. The brush 45 is so positioned that contact will be made to the combustible material-containing flashlamp 34a when the position has been reached indicated in dotted lines Fig. 1. Since brush 45 is stationary, each such flashlamp will have a circuit completed to it when the position is reached indicated at 34a. Therefore, as the wheel-like member, disk or rotary support 23 makes one revolution in a contra-clockwise direction, viewing Fig. 1, each of the said flashlamps 34 will in turn have a circuit completed to it through the brush 45, commutator segment 27 and contact ring 26, as each of the said flashlamps arrives in turn at the position indicated by flashlamp 34a.

The exact timing of the electrical circuit to the said flashlamps can be adjusted by changing the position of the commutator 26, that is, by turning it in a clockwise direction viewing Fig. 1, to cause the circuit to be completed earlier, or in a contraclockwise direction viewing Fig. 1, to cause the circuit to be completed later. If a set, series or multiplicity of flashlamps (in this instance, seventeen of them) all containing combustible material be inserted into the sockets of the wheel-like member, disk or rotary support 23, and it be caused to rotate by supplying power to the motor 22, all the said flashlamps start passing through the opening, passage or transverse formation 53 of the reflector 20. If a circuit be completed to wires 47 and 48, Figs. 1, 4 and 8, the said flashlamps will be caused to be ignited and start to flash because of the combustion of the material contained therein, and the point of ignition of each in turn will be approximately that position indicated in Fig. 1 by lamp 34a, and each of the said lamps will be ignited when it reaches that position. The light value of each said flashlamp will build up according to the characteristics of the flashlamps being used and which, as stated, are all of the type containing combustible material. In the disclosed embodiment of the invention, the peak is reached when the described flashlamp reaches the position indicated by such flashlamp 34b (that is, approximately at the focal point of the reflector), and since the wheel-like member, disk or rotary support 23 makes one complete revolution in one second, the seventeen flashlamps of the described type will be fired one after the next preceding, but all in the time of one second.

Figure 10:
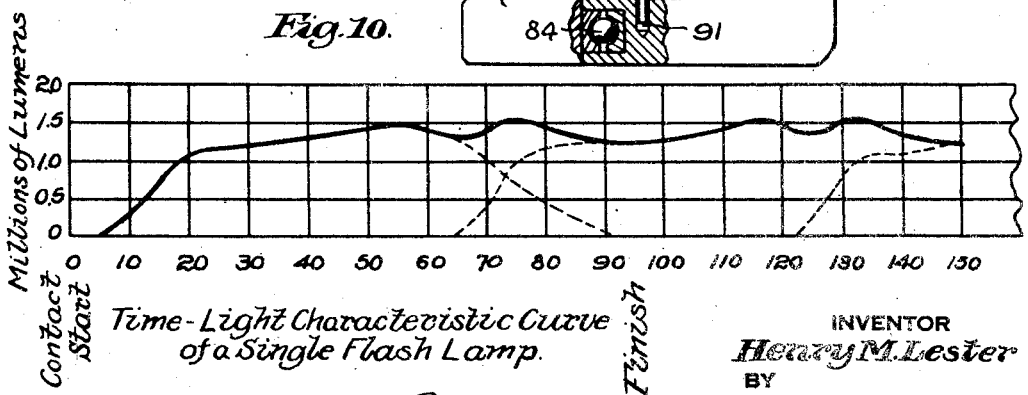
Fig. 10 is a chart showing plotted thereon the time-light characteristic curves of two flashlamps of said type fired in this device and the resultant curve produced thereby, being typical of the functioning of the entire multiplicity of said flashlamps employed.

If a flashlamp containing combustible material and having characteristics such as the General Electric Lamp No. 31 be used, the time light characteristics will be those indicated on the chart Fig. 10. As there indicated, a time lag exists of approximately seven milliseconds. After contact is made until illumination begins at 10 milliseconds, the light intensity has reached 250,000 lumens; at 14 milliseconds 500,000 lumens; at 18 milliseconds 1,000,000 lumens, after which there is a slower rise to 1,500,000 lumens at 58 milliseconds. At this point, however, contact is made to the next flashlamp which is of the described type and whose illumination begins at 64 milliseconds on the chart Fig. 10, just as the illumination of the said first flashlamp is beginning to decrease. The net result is shown by the solid line, indicating a momentary dip in the total illumination followed by a small rise in illumination, the resultant of the rising and falling light out-put of the two said flashlamps. At 90 milliseconds the first said flashlamp is completely extinguished and the characteristics now will be the same for the second said flashlamp. At 116 milliseconds on the said chart, the next contact or the contact of the third said flashlamp is made and the cycle is continued until all of the said seventeen flashlamps have been ignited. It is pointed out, as indicated by the chart Fig. 10, that an absolutely even level of illumination is not attained. However, the variation is between 1.25 and 1.50 million lumens, a difference which is well within the latitude of black and white film, and there is thus created a mean resultant peak level acceptable for high-speed motion-picture photography. It has been repeatedly demonstrated by me in the use of the disclosed mechanism that for all practical purposes an ideal light source is thereby attained for use with high-speed motion-picture cameras.

In using the herein described light source in conjunction with high-speed movie cameras, it is necessary to provide means for synchronizing the commencement of the illumination with the camera. This can be done in a number of ways, but one method or manner of doing so, to which my invention is not limited, is to use a switch already incorporated in the camera and connected to the film counter. Such switch is arranged so that the circuit can be closed at any predetermined footage of the film. Since such cameras do not attain their maximum speed instantly, it is usually necessary to allow such a camera to run for a sufficient time to attain picture-taking speed. This takes place usually after the first twenty-five feet have been run through the camera. Such switch I have discovered can be used for controlling the operation of the light source. However, it is often desirable to have further control of the light source. For instance, when photographing the action of the photo flashlamp, it has been found highly desirable to provide a pre-illumination, or, in other words, to cause a single flashlamp of the described type to be ignited, and at a proper time later to ignite the flashlamp that is to be photographed. This calls for a time delay mechanism. I have provided for the purpose, in my disclosed embodiment of the invention, a control box having suitable electric circuits to vary the condition of operation, which I will now describe.

Referring to Figs. 6 to 9, in Fig. 9 is shown an isometric view of the control box, indicated generally at 54, and at 55 is indicated a receptacle for connecting the light source. One pair of terminals supplies the current to the motor and the other pair supplies the electrical impulse to the described flashlamps. A similar receptacle is indicated at 56, but is used for a second flashlamp of the described type. A receptacle for plugging in the usual house current supply is indicated at 57, and pin jacks 58, 59 provide an auxiliary circuit which will be described presently. A pilot light 60 indicates that the batteries have been connected and the system is ready for operation. A battery switch is indicated at 61, a motor switch at 62, a manual operating switch at 63, pin jacks at 64, 65 for connecting test equipment, pin jacks 66, 67 for connecting the camera to the control box, a hinge door at 68 for gaining access to the time-delay mechanism, a jack cord at 69 used in selecting the mode of operation, a second jack cord at 70 for selecting the mode of operation to the auxiliary circuit, pin jacks 71, 72, 73 used in selecting the mode of operation, and pin jacks 74, 75, 76 used in selecting the mode of operation in the auxiliary circuit.

Figure 6:
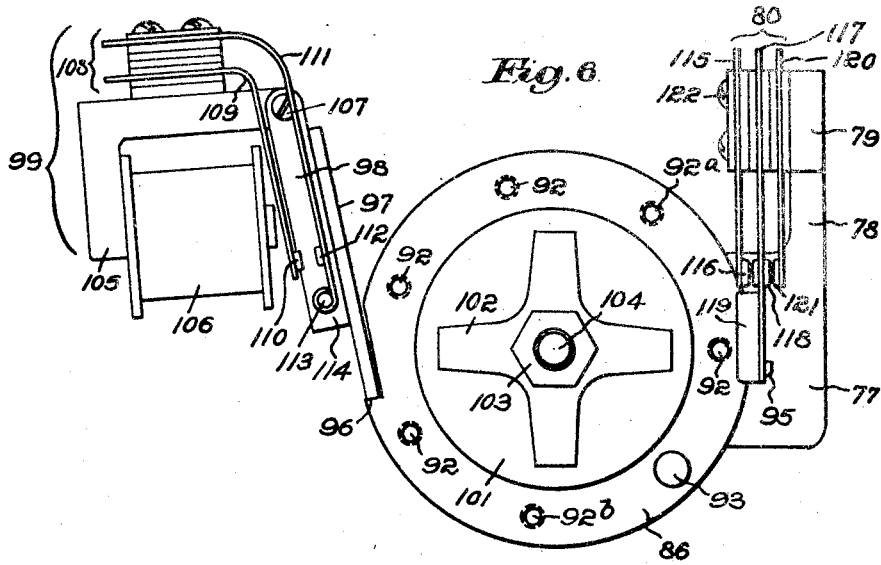
Fig. 6 is a top plan view of the time-delay mechanism clearly showing the switches, the operating magnet, the inertia wheel and the adjustable timing pin.
Figure 7:
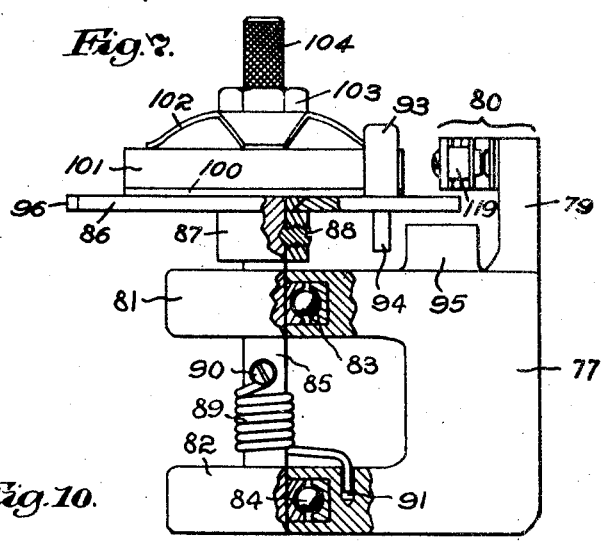
Fig. 7 is a side elevation of Fig. 6 having certain parts cut away to show more clearly the construction thereof.

In the control box 54 is contained a time-delay mechanism, most clearly shown in Figs. 6 and 7, which I will now describe. Such time-delay mechanism consists of a supporting frame member 77 having an outwardly extending arm 78 and a vertically extending member or finger 79, to which is attached a single-pole double-throw switch 80. Extending from said frame member 77 in the left hand direction, viewing Fig. 7, are bearing support bosses 81 and 82 carrying ball bearings 83 and 84 respectively. Any bearing of the low friction type can be used. Carried in the bearings 83 and 84 is a vertical shaft 85, and attached thereto is a disk 86 having a hub 87 and a set screw 88. Said disk 86 is locked to the shaft 85 by the set screw 88 when once properly positioned.

To cause the shaft 85 to turn in a clockwise direction, I herein provide a coiled spring 89, one end of which is anchored to the shaft 85 by a screw 90. The other end of the coiled spring 89 is anchored into the frame member 77 by means of a suitable hole 91. The disk 86 is provided with a series of threaded openings 92, 92, Fig. 6, into any of which can be threaded a switch-operating pin 93, the lower end whereof is provided with a finger 94 that engages a stop 95 integral with the frame member 77 when the pin 94 reaches the stop 95 as the disk 86 turns in a clockwise direction. The disk 86 is also provided with a notch 96 that is engaged by a flat latch member 97 carried by an armature 98 of a relay 99. Overlying the disk 86 is a friction washer 100, and overlying said friction washer 100 is a cylindrical inertia member 101 held in contact with the washer 100 by a spring 102 and a tension nut 103.

The upper end of the shaft 85 is provided with an extending knurled end 104. The vertically extending member or finger 79 carries the previously described switch 80, and at the left-hand side of the disk 86, viewing Fig. 6, is provided and suitably mounted in a fixed position a combination relay and latch, generally indicated at 99. Such relay is provided with the usual magnetic yoke member 105, coil 106 and armature 98, previously referred to, pivoted on a screw 107 on the yoke member 105. Also attached to the yoke member 105 is a switch 108 made up of a lower spring finger 109 having a contact 110 and an upper spring finger 111 having a contact 112. Said spring members 109 and 111 are provided with the usual insulation and are attached to the yoke member 108. The armature 98 is provided with a pin 113 for engaging a coiled end 114 of the spring 111. The switch 80 is made up of a spring finger 115 having a contact 116, a central spring finger 117 having a contact 118, and an insulating block 119 that is engaged by the switch operating pin 93 in a manner to be subsequently more fully described. The switch 80 is also provided with a third spring finger 120 having a contact 121. The several spring fingers 115, 117 and 120 are insulated from each other in the usual manner and are held to the member or finger 79 by screws 122, 122.

The operation of this timing device is as follows:

The control box 54, shown in Fig. 9, contains a suitable battery indicated at 123 in Fig. 8, which is used to energize the coil 106. The circuit used in connection with the coil 106 and the battery 123 will be subsequently fully described. The timing device disclosed in Figs. 6 and 7 is prepared for operation by turning the knob 104 in a contraclockwise direction until the notch 96 of the disk 86 is engaged by the latch 97, thus causing the spring 89 to be tensioned and so tending to turn the shaft 85 and the disk 86 in a clockwise direction. When the coil 106 of the relay 99 is energized, the armature 98 will be moved to the left viewing Fig. 6, carrying with it the latch 97, thus disengaging said latch from the notch 96. The disk 86 will now be caused to turn in a clockwise direction under the influence of the spring 89, carrying with it the inertia disk member 101, and such disk 86 and the inertia member 101 will continue to rotate until the switch-operating pin 93 and its finger 94 reach the stop 95. However, said inertia member 101 is not immediately stopped because it will be caused to slip against the tension spring 102 and the friction washer 100, thus helping to absorb the shock of stopping the disk 86.

It has been found by my experimentation that a unit built up substantially as disclosed herein will require approximately 60 milliseconds to make a complete rotation. Therefore, by selecting a given point at which to locate the switch operating pin 93, the switch 80 can be caused to be operated at any time ranging from 5 milliseconds to 50 milliseconds by locating said switch operating pin 93 in the proper hole 92. If the switch operating pin 93 is fitted into hole 92a, the device will cause a delay of approximately 10 milliseconds from the time the coil 106 was energized and the time the switch 80 was operated. If the switch operating pin 93 is located in hole 92b, it will be approximately 50 milliseconds. Said timing can be modified in the construction of the timer itself by varying the tension spring 89 or varying the weight and size of the inertia member 101. However, for all practical purposes the time and intervals just recited have proved most practical.

When the apparatus is set up for operation the lighting unit, Fig. 5, will be connected to the control box 54, Fig. 9. The lighting unit is provided with a four-wire cable and a four-terminal plug, not shown in Fig. 5, but shown diagrammatically in Fig. 8, and there indicated at 124. Said plug is provided with a dowel pin 124a for engaging a polarizing hole 55a of the receptacle 55. The wire 48 leading from the contact ring 25, previously described, is connected to one terminal of the plug 124, and the wire 47 that is connected to the commutator brush 45, previously described, connects to a second terminal of the plug 124. The wire 125 of the motor 22 is connected to a third terminal of the plug 124 and the wire 126 of the motor 22 is connected to the fourth terminal of said plug 124.

In operation the control box 54, Fig. 9, is connected to the electric current supply of a voltage suitable for operating the motor 22. The high-speed motion-picture camera has its switch 129, previously referred to and shown in dotted lines, Fig. 8, connected to said control box 54 through wires 130 and 131 having connecting plugs 127 and 128 respectively, through pin jacks 66 and 67 of said control box 54. The lighting unit is connected to the control box 54 by means of the plug 124 which is plugged into the receptacle 55 of the said control box 54. The switch 62 is thrown to the "on" position, thus completing a circuit from receptacle 57 through wire 132, switch 62, wire 133, contact 134 of receptacle 55, contact 135 of plug 124, wire 126, motor 22, wire 125, contact 136 of plug 124, contact 137 of receptacle 55, and wire 138, back to said receptacle 57.

Since a suitable source of electric current has been supplied to said receptacle 57, the motor 22 will now be caused to rotate, turning the lamp mounting wheel-like member, disk or rotary support 23 through the gear box 22b and shaft 22a, thus revolving the flashlamps 34, 34 of the described type and the commutator 26. The motor 22 will continue to operate and the described flashlamps will continue to revolve until the switch 62 is thrown into the "off" position, but said flashlamps 34, 34 of the described type will not be ignited until current has been supplied to the commutator brushes 45 and 46.

The high-speed motion-picture camera is set to operate the switch 129 at a predetermined footage of the film. For instance, after the camera has run through twenty-five feet of film, the switch 129 is caused to be closed, completing a circuit through wire 131, plug 128, pin jack 67, wire 139, wire 140 to the switch 61 (which had previously been set to the operating position), battery 123, wire 141, wire 142, coil 106 of relay 99, wire 143 to pin jack 66, connecting plug 127, through wire 130 back to the switch 129. This completes a circuit through the relay 99, causing the armature 98 to be moved in a direction to close the contacts 110 and 112. The plug on the jack cord 69 will be placed in pin jack 71 for this mode of operation. A circuit will now be from wire 141 through wire 143, through contacts 112 and 110, through wire 144 to pin jack 71, through plug wire 69, through wire 145, through wire 146, contact 147 of receptacle 55, contact 148 of plug 124, wire 48, brush 46, contact ring 25, through a flashlamp 34 of the described type, depending on which one of the multiplicity thereof is in position to be connected through a commutator segment 27 and with the commutator brush 45, through wire 47, to contact 149 of the plug 124, to contact 150 of the receptacle 55, through wire 151, wire 140, switch 61, and back to the battery 123. Since the lamp carrying wheel-like member, disk or rotary support 23 is continuously revolving, all of the described lamps will be connected and fired consecutively until all the multiplicity of flashlamps of the described type have been fired.

The mode of operation just set forth is what I choose to call instantaneous operation, by which I mean that the flashlamps 34 of the described type are caused to fire immediately upon the closing of the switch 129 contained in the camera or any other suitable circuit closing means initiated by the camera movement. At times, however, it is desirable when making high speed photographs to have the control device initiate a circuit to the apparatus to be photographed and to allow a sufficient delay thereafter before a circuit is completed to the described flashlamps.

For this purpose I have provided the delay unit, previously described and best shown in Figs. 6 and 7. When using this mode of operation, the plug cord 69 is plugged into pin jack 72, Fig. 8, the switch operating pin 93 is plugged in a suitable hole 92 of the disk 86 depending on the time-length of delay required, and the disk 86 is turned in a contraclockwise direction, and notch 96 is engaged by detent or latch 97.

When operating under these conditions the high-speed motion-picture camera will initiate the circuit, as previously explained, through switch 129, causing the relay 99 to be operated, but since the circuit through contacts 110 and 112 is opened because of the removal of cord plug 69 from pin jack 71, a circuit will not be now completed as heretofore, but instead as coil 106 is energized, the armature 98 will be caused to be moved, carrying with it the latch 97, thus taking it out of engagement with the notch 96 of the disk 86, allowing the latter to move in a clockwise direction until the switch operating pin 93 engages the insulating block 119 carried by the swtich member 117, thus causing contacts 118 and 121 to be closed, thereby completing a circuit through wires 145, 146, etc., as previously described, but at the time-interval after the operation of the relay 99.

The auxiliary apparatus to be operated so as to be photographed in operation, is connected to the pin jacks 58 and 59 and the plug cord 70 is plugged into pin jack 74. A circuit to the auxiliary apparatus will thus be completed, whereupon relay 99 is operated, closing contacts 112 and 110, completing a circuit from wire 141 through wire 143, wire 144, wire 152, pin jack 74, plug cord 70, and pin jack 58.

Under the conditions just set forth the high-speed motion-picture camera will be set in operation. After a sufficient footage of film has gone through the said camera, such switch 129 of the camera will be closed, thus operating the relay 99, closing contacts 112 and 110 and releasing the disk 86 for operation, which in turn closes the switch contacts 118 and 121. The plug cord 69 having previously been connected with pin jack 72, the circuit to the flashlamps 34 of the described type will be from wire 141, contact 118, contact 121, wire 153, to pin jack 72, jack cord 69, wire 145, etc., as in the previous instance. It will be noted that the circuit to the auxiliary apparatus will be completed at the same time the disk 86 is released for a turning motion, and at a time somewhat later depending on the position of the switch operating pin 93. At this time the contacts 118 and 121 will be closed, thus completing a circuit to the described flashlamps 34. This mode of operation is often used when it is desirable to set in motion the object being photographed, just prior to the actual taking of the picture.

It is sometimes desirable to operate the auxiliary apparatus at the same time the described flashlamps 34 are ignited. In such case it is only necessary to connect the plug cord 70 to a pin jack connected to the pin jack being used in the flashlamp circuit. It will be noted that the pin jacks 71 and 74 are connected together by wire 152, as are 72 and 75, 73 and 76, by wire 154 and wire 155 respectively.

It is sometimes desirable to open the auxiliary circuit at definite time-delay after the circuit has been completed to the flashlamps of the described type. In such case the plug cord 69 would be connected to the pin jack 71 and the plug cord 70 would be connected to pin jack 76. Thus, if switch 80 was operating through the time delay means, a circuit would be broken between contacts 116 and 118.

Another mode of operation is to operate the auxiliary circuit in advance of the flashlight circuit. This is desirable when making a photograph of the flash of a flashlamp. In this case the auxiliary circuit should be connected through the plug cord 70 and the pin jack 74, and the circuit to the flashlamp whose flash is to be photographed, through the plug cord 69 and the pin jack 72. In this case the flashlamp whose flash is to be photographed should be connected to contacts 147 and 150 of receptacle 55, and such flashlamp would be ignited when the contacts 118 and 121 are closed. A second flashlamp of the described type would be connected to the auxiliary circuit (that is, to pin jacks 58 and 59) and caused to be ignited just prior to the flash of the flashlamp being photographed. This is found to be very desirable in making these photographs since the light used for the actual photograph is the light emitted from the flashlamp whose flash is being photographed and which flashlamp is also of the described type. The auxiliary flashlamp is ingited first, thereby to illuminate the object being photographed, in this case, a photo flashlamp of the described type. If only the illumination used in making the picture of the flash of the flashlamp is the illumination from the flashlamp itself, this has been found to be impractical because a very unsatisfactory projected picture is had.

It will be noted, by referring to the circuit diagram, Fig. 8, that almost any combination of circuits can be had. For instance, the circuit to the described flashlamps and the auxiliary circuit can be closed together and substantially instantaneously upon the closing of the switch 129, or it can be closed at the same time but at a time-delay after the closing of switch 129. The auxiliary circuit can be completed at the time of closing the switch 129 and the circuit to the lamp unit can be closed after a time-delay, or the circuit to the lighting unit can be closed at the time of closing the switch 129 and the auxiliary circuit can be closed following a time-delay after the closing of the light unit circuit.

It is also possible to open the auxiliary circuit at a time-delay after the circuit is completed to the lighting unit, or it is possible to open the lighting unit circuit after the auxiliary circuit has been completed.

Thus by the disclosed apparatus I have provided a practical control unit for selecting any one of many modes of operation.

It is sometimes desirable to have two of the flashing units connected and operated simultaneously. For this purpose I have provided a second receptacle 56 which is connected in parallel with the receptacle 55, and the second lighting unit should be provided with a plug similar to the plug 124 having the same connections to the lighting unit.

It will be apparent that a switch other than the switch 129 in the high-speed motion-picture camera can be used for initiating the flashing of the flashlamps of the described type, although it is my usual practice to use a switch operated by the high-speed motion-picture camera for starting the flashing unit. I have also provided a switch 63 for operating the flashing unit, its principal purpose being for testing. I have also provided the lamp 60 to indicate when the battery switch 61 is in operating condition.

To provide ready means for testing all the lamps of the described type and their circuits prior to operation, I have provided the pair of pin jacks 64 and 65 into which can be plugged a high resistance ohm meter. This test can be made in the following manner. The switch 61 is placed in the open condition, thus extinguishing the pilot light 60, the ohm meter is plugged into pin jacks 64 and 65, the jack cord 69 is plugged into the pin jack 73. The lamp-support wheel-like member, disk or rotary support 23 is then rotated slowly through a full revolution. Thus the resistance can be read on the ohm meter for each such flashlamp as its commutator segment passes over the brush 45. If there is a poor connection anywhere in the circuit, the meter will disclose by its reading an abnormally high resistance, if there is a short anywhere in the circuit, the meter will read an abnormally lower resistance, and if there is an open circuit such as an open filament, the meter will not read at all. Such test thus gives a positive indication of the condition of the electrical circuit prior to the flashing of the flashlamps of the described type.

I have throughout the specification, in describing the exemplary embodiment of my invention, referred to a series or multiplicity of flashlamp bulbs all of the type containing combustible material. In such embodiment seventeen are shown, and I have stated that the number may be substantially varied within the scope of the invention, and have referred to using flashlamps of the described type having a longer duration of flash, in which case a fewer number of flashlamp bulbs of the described type would be used.

The actual oscillographic time-lumen curves of such seventeen lamps of the described type, while providing sufficient consecutive overlapping of the flashes to provide a continuous light of high intensity maintained at approximately a mean resultant peak level acceptable for high-speed motion-picture photography, does not produce optimum level of illumination when made to flash every fiftfy-nine milliseconds approximately. They produce an approximate approach to 1.4 million lumens level of illumination.

I may within the scope of the invention herein disclosed flash the #31 lamp bulbs of the described type every twenty-two milliseconds apart (approximately), and thereby obtain an even better average performance curve of the level of illumination and a level of an average of three million lumens will be reached. In such case the "peaks and valleys" will be of much smaller amplitude and much more frequent. Such embodiment of the invention calls for forty-five #31 General Electric lamps of the described type upon the wheel-like member, disk or rotary support, and whereas the rotor herein shown has an O. Dia. of 7¾ inches, the wheel-like member, disk or rotary support carrying forty-five General Electric lamps of the described type is 20½ inches in O. Dia., and the wheel-like member in such case measures substantially 36 inches in diameter, and revolving at 60 revolutions per minute has a circumferential velocity of about 9½ feet per second.

Inasmuch as the use of forty-five flashlamp bulbs of the described type results in a much larger unit, and inasmuch as an important object of my invention is to provide a high intensity source of illumination that is readily portable, I prefer to use the embodiment of my invention herein illustrated and specifically described, but my invention is not limited thereto.

Obviously my invention is not limited to either the illustrated embodiment or that here specifically referred to as, so far as I am aware, I am the first to provide for the movement (preferably by rotation) of a series or multiplicity of bulbs of the described type with sufficient consecutive overlapping of the flashes thereof as to provide a continuous light of high intensity maintained at approximately a mean resultant peak level acceptable for high-speed motion-picture photography.

By my invention I have provided a new method of and novel means for creating a light source of extremely high intensity for use in making high-speed motion-pictures, such light source being of substantially uniform light intensity over a period sufficiently long for photographing the average scene at high speed. I have also provided means for controlling the circuit to the light source so that any one of a number of different modes of operation can be used. This is very desirable because when the photographer arrives with the apparatus upon the scene for making pictures, he may be called upon to make photographs under many varying conditions. Therefore I have provided very simple means for effecting the described illumination and the control of its operation or functioning, in compact form, making the entire mechanism or apparatus readily transportable.

Having thus described one illustrative embodiment of the invention and the best mode known to me for practising the same, it is to be understood that although specific terms are employed, they are used in a generic and descriptive sense and not for purposes of limitation, the scope of the invention being set forth in the following claims.

I claim:

1. That method of taking a great multiplicity of motion pictures on the order of one thousand or more during a single exposure cycle of a high-speed motion-picture camera, which cycle lasts on the order of one second during which the film is continuously exposed and is traveling at high speed, and of providing high-intensity illumination from the intensity peaks of a multiplicity of combustible-material-containing photoflash bulbs, all flashed at equally spaced intervals during such single exposure cycle, which comprises the following steps: (1) taking, by a high-speed motion-picture camera a great multiplicity of pictures on the order of one thousand or more on a very rapidly-traveling continuously-exposed film during a single exposure cycle of such high-speed motion-picture camera, which cycle lasts on the order of one second; (2) positioning in close proximity to each other a multiplicity of combustible-material-containing photoflash bulbs for taking the said great multiplicity of pictures while said bulbs are consecutively flashed during a single exposure cycle of such high-speed motion-picture camera, so that the light of each such bulb may, when flashed, be directed, during the effective portion of its flash, at the same object to be photographed a great multiplicity of times during such single exposure cycle of the high-speed motion-picture camera; (3) synchronizing the feeding and continuous exposure of the film of the high-speed motion-picture camera with the flashing of said multiplicity of such bulbs during such single exposure cycle of such camera; and (4) during such single exposure cycle of such high-speed motion-picture camera and, while the film of said camera is being continuously fed and continuously exposed, flashing all of said multiplicity of such bulbs at such equally spaced intervals and with such time lapse between the creation of successive flashes of such bulbs, that the intensity peak of the light of each flashed bulb follows so closely the intensity peak of the light of the combustible-material-containing bulb flashed immediately preceding, that there is produced a resultant light continuous throughout the flashing of the said multiplicity of said bulbs with sufficient consecutive overlapping of the flashes thereof to provide a continuous light of high intensity maintained at approximately a mean resultant peak level throughout such single exposure cycle of the high-speed motion-picture camera in which such great multiplicity of pictures is taken upon the said rapidly traveling film of the said high-speed motion-picture camera.

2. That method of taking a great multiplicity of motion pictures during a single exposure cycle by a high-speed motion-picture camera, and of providing high-intensity illumination therefor, in accordance with claim 1, but wherein during said single exposure cycle of said high-speed motion-picture camera the said multiplicity of such bulbs is caused, by reason of such step of synchronization, to traverse one after another to and past the same point which is in closest relation to the object being photographed during said single exposure period by said high-speed motion-picture camera and so that each such bulb, when flashed, is at the same said point in closest relation to the object being photographed.

3. In mechanism providing for the taking of a great multiplicity of motion pictures of the order of one thousand or more during a single exposure cycle of a high-speed motion-picture camera, which cycle lasts on the order of one second, during which the film is continuously exposed and is traveling at high speed, and providing, for the purpose of such motion picture taking, high intensity illumination from the intensity peaks of a multiplicity of combustible-material-containing photoflash bulbs, all flashed at equally spaced intervals during such single exposure cycle; supporting means to support a multiplicity of brief-intensity-peak photoflash bulbs each containing combustible material, in such close proximity to each other upon said supporting means that the light of each of said bulbs may, when flashed at equally spaced intervals, be directed at approximately the peak thereof, at the same object to be photographed on the order of one thousand times or more by the high-speed motion-picture camera during said single exposure cycle, so that, when all said bulbs on said supporting means are successively flashed during a short predetermined time interval constituting the single exposure cycle, lasting on the order of one second, of the high-speed motion-picture camera, the entire said multiplicity of such bulbs may have the light thereof effectively directed at the same object and constitute the entire light source for such single exposure cycle of the said high-speed motion-picture camera; and means including a switch of said high-speed motion-picture camera, and which switch is connected to the film counter of said high-speed motion-picture camera for synchronizing the commencement of the flash bulb illumination of said multiplicity of bulbs with the feeding of the film in and during the said single exposure cycle of the camera, and for flashing all of said multiplicity of such bulbs, during such single exposure cycle of said camera, but at spaced intervals during said single exposure cycle, with such time lapse between consecutive flashes from said bulbs that the intensity peak of the light from each such flashed bulb follows so closely the intensity peak of the light of the said type of bulb flashed immediately preceding that there is produced a resultant light of substantially continuous, uniform, high light intensity, which resultant light is the composite product of the successive flashes all the multiplicity of the said flashlight bulbs, and which resultant light continues through the flashing of all the lights of the specified multiplicity of said bulbs, all during said single exposure cycle of the high-speed motion-picture camera.

4. Mechanism in accordance with claim 3, providing for taking a great multiplicity of motion-pictures during a single exposure cycle of a high-speed motion-picture camera and for providing high intensity illumination for such picture taking, but wherein during said single exposure cycle of said high-speed motion-picture camera the said multiplicity of such bulbs is caused by means constituting a part of said mechanism and operated thereby, to traverse one after another to and past the same point which is in closest relation to the object being photographed during said single exposure period by said high-speed motion-picture camera, and wherein the said means for synchronizing the commencement of the flash bulb illumination with the feeding of the film of said camera causes each of the said multiplicity of bulbs upon said supporting means to flash when it reaches the same said point that is in closest relation to the object being photographed.

5. Mechanism in accordance with claim 3, providing for the taking of a great multiplicity of motion pictures during a single exposure cycle of a high-speed motion-picture camera and for providing high intensity illumination for such picture taking, but wherein during said single exposure cycle of said high-speed motion-picture camera the said supporting means for the said multiplicity of said bulbs is rotated by the said mechanism to cause the said bulbs carried by the said supporting means to pass one after another to and past the same point which is in closest relation to the object being photographed during said single exposure period by said high-speed motion-picture camera, and wherein the said means for synchronizing the commencement of the flash bulb illumination with the feeding of the film of said camera causes each of the said multiplicity of bulbs upon said supporting means to flesh when it reaches the same said point that is in closest relation to the object being photographed.

6. High-intensity illumination means in accordance with claim 3, but wherein a reflector is provided in fixed relation to the object to be photographed by such high-speed motion-picture photography, and in such proximity to the support for such combustible-material-containing bulbs that each of the said bulbs may, in succession in the movement of the support, be presented thereby in front of such reflector, and means to impart movement to said support at such speed and in such timed relation to the successive flashing of such photoflash bulbs that each such bulb, when it is flashed, is positioned in front of said reflector.

7. High intensity illumination mechanism in accordance with claim 3, but wherein the support for the multiplicity of such combustible-material-containing photoflash bulbs is a disk mounted for rotation upon a pivot, and wherein the said bulbs are mounted upon the periphery of said disk equidistantly thereabout, and wherein the said disk carries a commutator, and wherein a brush is stationarily mounted in operative electrical relation to said commutator, and wherein electrical connections are provided to each such bulb, so that in the rotation of such disk such bulbs are successively flashed at uniform, brief intervals, as each such bulb arrives in turn at the same flashing position.

8. High intensity illumination mechanism in accordance with claim 3, but wherein during the said single exposure cycle of the high-speed motion-picture camera the said supporting means for the said multiplicity of such bulbs is caused to be rotated by the said mechanism, and wherein pre-illumination means is provided, such as for causing a single combustible-material-containing flashlamp to be ignited and subsequently the ignition of a flashlamp whose flash is to be photographed by a high-speed motion-picture camera during such illumination.

9. High intensity illumination mechanism in accordance with claim 3, but wherein during the said single exposure cycle of the high-speed motion-picture camera the said supporting means for the said multiplicity of such bulbs is caused to be rotated by the said mechanism, and wherein time-delay mechanism is provided to control the commencement of the said illumination.

10. High intensity illumination in accordance with claim 3, but wherein there is provided an electric motor for rotating the said supporting means, and wherein electrical wiring is provided to supply current to said electric motor and also electrical wiring for supplying current to said combustible-material-containing photoflash lamp bulbs, and wherein there is provided control means for controlling the commencement of the illumination, and wherein said control means is provided with pin jacks 64, 65 for connecting a test equipment thereto.

11. High intensity illumination mechanism in accordance with claim 3, but wherein during the said single exposure cycle of the high-speed motion-picture camera the said supporting means for the said multiplicity of such bulbs is caused to be rotated by the said mechanism, and wherein time-delay mechanism is provided to control the commencement of the said illumination, and wherein said time-delay mechanism includes a shaft having a disk, spring means tending to turn said shaft, said disk having a series of circumferentially spaced formations at any one of which a switch-operating pin may be placed, and a stop to be engaged by said pin in the turning movement of said disk.

12. High intensity illumination mechanism in accordance with claim 3, but wherein during the said single exposure cycle of the high-speed motion-picture camera the said supporting means for the said multiplicity of such bulbs is caused to be rotated by the said mechanism, and wherein time-delay mechanism is provided to control the commencement of the said illumination, and wherein said time-delay mechanism includes a shaft having a disk, spring means tending to turn said shaft, said disk having a circumferentially positioned formation, a latch member to engage said formation, and an armature and relay controlling the movement of said latch member.

13. High intensity illumination mechanism in accordance with claim 3, but wherein during the said single exposure cycle of the high-speed motion-picture camera the said supporting means for the said multiplicity of such bulbs is caused to be rotated by the said mechanism, and wherein time-delay mechanism is provided to control the commencement of the said illumination, and wherein said time-delay mechanism includes a shaft having a disk, spring means tending to turn said shaft, and an inertia member associated with said disk and co-axially arranged with respect thereto.

14. High intensity illumination mechanism in accordance with claim 3, but wherein during the said single exposure cycle of the high-speed motion-picture camera the said supporting means for the said multiplicity of such bulbs is caused to be rotated by the said mechanism, and wherein time-delay mechanism is provided to control the commencement of the said illumination, and wherein said time-delay mechanism is provided with single-pole double-throw switch 80 and with a switch operating member positionable at any one of a number of spaced points upon a rotatable member so as to operate said switch at any time between predetermined time limits, and wherein said time-delay mechanism is provided with such rotatable member carrying said switch operating member, and wherein releasable means is provided to hold said rotatable member from turning.

15. High intensity illumination mechanism in accordance with claim 3, but wherein during the said single exposure cycle of the high-speed motion-picture camera the said supporting means for the said multiplicity of such bulbs is caused to be rotated by the said mechanism, and wherein there is provided control means for controlling the commencement of the illumination, and wherein the said control means is provided with an auxiliary circuit extending to an auxiliary apparatus that is to be thereby set in operation and then by said high intensity illumination to be photographed while in operation.

16. High intensity illumination mechanism in accordance with claim 3, but wherein during the said single exposure cycle of the high-speed motion-picture camera the said supporting means for the said multiplicity of such bulbs is caused to be rotated by the said mechanism, and wherein there is provided an auxiliary circuit to an auxiliary device to be photographed by the illumination mechanism, and wherein means is provided to open said auxiliary circuit and to complete the circuit to the combustible-material-containing flashlamp bulbs for the flashing thereof, in any desired time relation with respect to each other, so that the two operations may occur simultaneously or either may precede the other.

17. High intensity illumination mechanism in accordance with claim 3, but wherein during the said single exposure cycle of the high-speed motion-picture camera the said supporting means for the said multiplicity of such bulbs is caused to be rotated by the said mechanism, and wherein time-delay mechanism is provided to control the commencement of the said illumination, and wherein said time-delay mechanism includes a shaft having a disk, spring means tending to turn said shaft, said disk having a circumferentially positioned formation, a latch member to engage said formation, an armature and relay controlling the movement of said latch member and a switch 108 governing said armature and relay.

HENRY M. LESTER.

REFERENCES CITED

The following references are of record in the file of this patent:

UNITED STATES PATENTS

| Number | Name | Date |
|---|---|---|
| 623,874 | Boyer | Apr. 25, 1899 |
| 1,063,778 | Courson | June 3, 1913 |
| 1,080,750 | Courson | Dec. 9, 1913 |
| 1,086,040 | Giannattasio | Feb. 3, 1914 |
| 1,785,950 | Giannattasio | Dec. 23, 1930 |
| 2,186,013 | Edgerton | Jan. 9, 1940 |
| 1,274,009 | Courtier | July 30, 1918 |
| 2,244,114 | Noir | June 3, 1941 |
| 2,404,970 | Magdsik | July 30, 1946 |
| 2,408,469 | Malloy | Oct. 1, 1946 |

FOREIGN PATENTS

| Number | Country | Date |
|---|---|---|
| 699,720 | Germany | Dec. 28, 1940 |
| 18,557 | Australia | May 31, 1935 |